United States Patent [19]

Inoue et al.

[11] Patent Number: 5,476,709
[45] Date of Patent: Dec. 19, 1995

[54] POLYMERIC INSULATING MATERIAL AND FORMED ARTICLE MAKING USE OF THE MATERIAL

[75] Inventors: Takeo Inoue; Shigeru Kimura; Tutomu Iwatani; Takayuki Yamada; Yukio Ishii; Ryuichi Sugimoto, all of Osaka, Japan

[73] Assignee: Mitsui Toatsu Chemicals, Inc., Tokyo, Japan

[21] Appl. No.: 73,676

[22] Filed: Jun. 8, 1993

[51] Int. Cl.⁶ ..................................................... B32B 7/02
[52] U.S. Cl. .......................... 428/216; 428/323; 428/910; 524/583; 524/265; 524/269; 524/430; 524/431; 524/433; 524/435; 524/436; 524/437; 525/69
[58] Field of Search .......................... 428/220, 215, 428/216, 910, 323; 524/265, 269, 583, 430, 431, 433, 435–437; 525/69

[56] References Cited

U.S. PATENT DOCUMENTS

| | | | |
|---|---|---|---|
| 3,197,454 | 7/1965 | Plaster | 526/159 |
| 3,860,542 | 1/1974 | Sakaguchi et al. | 524/399 |
| 4,182,852 | 1/1980 | Shiga et al. | 528/494 |
| 5,085,916 | 2/1992 | Wilhelm et al. | 428/156 |
| 5,175,051 | 12/1992 | Schloegl | 428/330 |

FOREIGN PATENT DOCUMENTS

| | | |
|---|---|---|
| 362563 | 4/1990 | European Pat. Off. . |
| 2186494 | 1/1974 | France . |
| 2381791 | 2/1978 | France . |
| 58-188627 | 11/1983 | Japan . |
| 59-63609 | 4/1984 | Japan . |
| 61-110906 | 5/1986 | Japan . |
| 62-113548 | 5/1987 | Japan . |
| 1-166955 | 6/1989 | Japan . |
| 1-254749 | 10/1989 | Japan . |
| 2-150443 | 6/1990 | Japan . |

Primary Examiner—Mark Sweet
Attorney, Agent, or Firm—Burns, Doane, Swecker & Mathis

[57] ABSTRACT

The invention provides a polymeric insulating material having a high dielectric breakdown voltage. The material comprises polypropylene which has been obtained in a yield of at least 300,000 g/g-Ti based on titanium in a catalyst upon polymerization, contains ash in an amount not greater than 40 ppm by weight when analyzed by completely burning the polypropylene in air, said ash containing titanium in an amount not greater than 1 ppm by weight based on the weight of the polypropylene, and also contains chlorine in an amount not greater than 2 ppm by weight and boiling n-heptane soluble matter in an amount not smaller than 1 wt. % but not greater than 10 wt. %. According to the invention, it is possible to further improve the dielectric breakdown voltage by adding to the polypropylene an inorganic oxide or hydroxide free of particles of 10 μm and greater in diameter and having an average particle size not greater than 1 μm, an organopolysilane, a maleic-anhydride-grafted polypropylene, or a silane compound containing at least one organic polyether group.

10 Claims, No Drawings

POLYMERIC INSULATING MATERIAL AND FORMED ARTICLE MAKING USE OF THE MATERIAL

BACKGROUND OF THE INVENTION

1. Field of the Invention

This invention relates to a polymeric insulating material having excellent electrical characteristics. Specifically, the present invention is concerned with a polymeric insulating material having good electrical insulating property and made of polypropylene of particular physical properties and also with a formed article making use of the same. Notably, the present invention pertains to a polymeric insulating material having excellent electrical characteristics even when formed thin and also to a formed article of a small thickness obtained from the material.

2. Description of the Related Art

Polymeric materials such as polyolefins, polyesters, polyfluorinated vinylidene, silicone resins, epoxy resins and polystyrene generally have a low electrical conductivity and are used as a wide variety of electrical materials by making use of electrical characteristics such as insulating property. In addition to the excellent electrical property, these polymeric materials also feature high flexibility, heat resistance and hydrophobicity so that they have found a wide spread utility in many products.

Polyolefins, especially polypropylene can be easily molded or otherwise formed or processed, possess superb electrical, mechanical and chemical properties and; owing to their availability at low price, are extensively employed as various electrical materials. They are widely used as electrical insulating materials, for example, as electret materials in the form of filters or films, as electrical insulating tapes or covering materials, or as capacitor insulating films in the form of biaxially-oriented films. As propylene employed for such products, the higher the insulation resistance, the better. Higher dielectric breakdown strength furnishes products of higher performance. Improvements have hence been made in this respect.

Insulation characteristics of polypropylene employed these days are however not considered very good. Production of polypropylene having still better insulation characteristics, if feasible, will be extremely meritorious from the industrial viewpoint. Toward this goal, high purification of polypropylene has therefore been studied to date. For example, Japanese Patent Laid-Open Nos. 110906/1986, 63609/1984, 188627/1983, etc. disclose that the dielectric breakdown strength of biaxially-oriented polypropylene can be enhanced by increasing the stereoregularity of starting polypropylene, reducing the content of boiling n-heptane soluble matter and hence increasing the crystallization degree. Further, Japanese Patent Laid-Open Nos. 113548/1987, 254749/1989, 166955/1989, 150443/1990, etc. disclose that insulation characteristics of polypropylene can be improved by lowering as much as possible the contents of catalyst residue or chlorine remaining in the polypropylene.

Industrial production of high-purity polypropylene so improved, however, results in the problem of high production cost. An increase in stereoregularity leads to a higher crystallization degree, which in turn results in the problems that formed products tend to become harder and the formability or processability is deteriorated. Upon spinning, for example, it is difficult to spin such polypropylene, and when stretched, the polypropylene may undergo stretching breakage. When formed into a film, voids may be formed. As a consequence, such increased stereoregularity can provide, as products, only formed products having poor insulation characteristics. In practice, it is very difficult to completely eliminate impurities so that impurities as residue from a catalyst and the like are contained more or less.

There is an extremely strong demand for the dimensional reduction of electrical and electronic parts. In such electrical and electronic parts, polypropylene is used as an insulating material such as capacitor films. To meet the above demand, it is desired to increase the breakdown resistance of the insulating material so that the insulating material can be reduced in thickness to have smaller dimensions.

Stretched polypropylene films obtained by such conventional methods have rather high dielectric breakdown resistance where they have a thickness of approximately 10 μm or greater but, when their thicknesses are reduced to about 6 μm or less, especially about 4 μm or smaller, develop the drawback that the dielectric breakdown resistance per unit thickness is extremely decreased. It is therefore difficult to obtain thin films having high dielectric breakdown resistance, thereby still failing to meet the demand for the dimensional reduction of electric and electronic parts.

SUMMARY OF THE INVENTION

With a view to overcoming the problems described above, the present inventors have proceeded with a variety of research to provide a polyolefin material which can be furnished at low cost without impairing its formability upon using the same in the form of a filter or film as an electret material or in the form of a biaxially-oriented film as an electric insulating material such as a capacitor film. As a result, it has been found that the electrical insulation characteristics of a polymeric material are affected considerably by impurities contained in the polymeric material. These impurities have been found to include catalyst residue, dust in the air, and the like. It has also been found that certain specific components out of such impurities give influence to electrical insulation characteristics and control of such components in both kind and quantity makes it possible to bring about good insulation characteristics even if impurities such as a catalyst residue remain at a relatively high concentration in the polymer. It has also been found that polypropylene containing particular boiling n-heptane soluble matter rather than increasing the crystallization degree by reducing the content of boiling n-heptane soluble matter as in the conventional art has good electrical insulating property and moreover has well-balanced formability and physical properties. These findings have led to the completion of the present invention.

In one aspect of this invention, there is thus provided a polymeric insulating material having a high dielectric breakdown voltage. The material comprises polypropylene which has been obtained in a yield of at least 300,000 g/g-Ti based on titanium in a catalyst upon polymerization, contains ash in an amount not greater than 40 ppm by weight when analyzed by completely burning the polypropylene in air, said ash containing titanium in an amount not greater than 1 ppm by weight based on the weight of the polypropylene, and also contains chlorine in an amount not greater than 2 ppm by weight and boiling n-heptane soluble matter in an amount not smaller than 1 wt. % but not greater than 10 wt. %.

The material can preferably comprise high-purity polypropylene containing, per cubic centimeter, not more than 6,000 foreign particles of from 1 μm to 10 μm, both inclusive, not more than 1,000 foreign particles of from 5 μm to 10 μm, both inclusive, and no foreign particles greater than 10 μm.

In another aspect of this invention, there is also provided a formed polypropylene article having high electrical insulating property, which article has been obtained by stretching the polymeric insulating material or the preferred polymeric insulating material in at least one direction.

In the present invention, the dielectric breakdown voltage of the above polymeric insulating material or the preferred polymeric insulating material can be increased further by incorporating a particular additive therein.

In a further aspect of this invention, there is also provided a polymeric insulating material having a high dielectric breakdown voltage and obtained by adding to the polypropylene an inorganic oxide or hydroxide in an amount not smaller than 1 ppm by weight but not greater than 10% by weight. The inorganic oxide or hydroxide can preferably be the oxide or hydroxide of magnesium, aluminum or iron, which is free of particles of 10 μm and greater in diameter and has an average particle size not greater than 1 μm.

As additives, organopolysilanes, maleic-anhydride-grafted polypropylene and silane compounds containing at least one organic polyether group can also show excellent effects.

In a still further aspect of this invention, there is also provided a polymeric insulating material obtained by adding to the polypropylene an organopolysilane in an amount not smaller than 50 ppm by weight but not greater than 10% by weight, maleic-anhydride-grafted polypropylene in an amount not smaller than 50 ppm by weight but not greater than 10% by weight or a silane compound in an amount not smaller than 50 ppm by weight but not greater than 10% by weight, said silane compound containing at least one organic polyether group.

In a still further aspect of this invention, there is also provided a formed polypropylene material having high electrical insulating property. This article has been obtained by stretching the polymeric insulating material added with one of the various additives described above and having the high dielectric breakdown voltage in at least one direction.

In a still further aspect of the present invention, there is also provided an electrical insulating film obtained by biaxially stretching the polymeric insulating material either containing or not containing one of the above additives.

To obtain polypropylene useful for the production of a polymeric insulating material according to this invention, it is preferred to polymerize propylene in the presence of a polymerization catalyst which comprises a solid titanium catalyst component containing titanium, magnesium, a halogen and an internal electron-donating compound, an organometal compound containing a metal selected from Groups 1, 2 and 3 of the Periodic Table and an external electron-donating compound. A particularly preferred, polymeric insulating material according to this invention can be obtained by subjecting the polypropylene, which has been obtained in accordance with the above polymerization process, to dehalogenation treatment.

In the case of the electrical insulating film obtained by biaxially stretching the polymeric insulating material of this invention, the superb advantages of the present invention can be fully achieved when the thickness of the film ranges from 1 μm to 6 μm.

DETAILED DESCRIPTION OF THE INVENTION

In the present invention, it is essential that the polypropylene has been obtained in a yield of at least 300,000 g/g-Ti, preferably at least 1,000,000 g/g-Ti, more preferably at least 3,000,000 g/g-Ti based on titanium in a catalyst upon polymerization.

Since it has conventionally been required to use polypropylene of low ash content when it is employed as a polymeric insulating material, polypropylene is subjected to particular post-treatment after its polymerization so that the content of ash therein is lowered. By the post-treatment, it is hence possible to reduce the content of ash in the polypropylene. When particular post treatment is designed for polypropylene obtained in a yield of 300,000 g/g-Ti or less based on titanium in a catalyst upon polymerization and the content of whole ash in the polypropylene is lowered, the polypropylene so obtained can provide a stretched film having substantially high dielectric breakdown resistance when the thickness of the film is about 10 μm or greater but, when the thickness of the film is reduced to about 6 μm or less, especially about 4 μm, the polypropylene develops the drawback that the dielectric breakdown resistance per unit thickness drops extremely. Even from such polypropylene, it is accordingly difficult to obtain high dielectric breakdown resistance with a thin film.

Although no particular cause has been ascertained yet, the present inventors gather that, where the yield of propylene is not high based on titanium in a catalyst upon polymerization, ash-reducing post-treatment can considerably remove titanium as a whole but the polypropylene so treated still contains some localized areas where titanium still remains without elimination and the localized areas act as points of defect for the reduction of dielectric breakdown resistance when the polypropylene is formed into a thin film.

The present inventors have carried out an extensive investigation. As a result, it has first been found that, to be usable in the present invention, titanium must be fully dispersed without agglomeration in polypropylene obtained by polymerization. To have the titanium fully scattered, it has then been found important to employ as a raw material polypropylene obtained in a sufficiently high yield based on titanium metal upon polymerization. These findings have led to the completion of the present invention.

In the present invention, the content of titanium in the ash is required to be not higher than 1 ppm by weight, preferably 0.5 ppm by weight or lower, more preferably 0.3 ppm by weight or lower based on the weight of the polypropylene. When the yield is low, it is necessary to eliminate titanium out of catalyst residue from polypropylene obtained by polymerization. When the yield of polypropylene is 1,000,000 g/g-Ti or higher based on titanium upon polymerization, it is not necessary at all to eliminate titanium from the polypropylene. Selection of an appropriate catalyst system and adequate polymerization conditions therefore makes it possible to substantially simplify post treatment for polypropylene to be obtained by polymerization.

Catalyst residue remaining in the polymer does not cause trouble provided that it is scattered as very fine particles in the polymer. In such catalyst residue, titanium tends to agglomerate together, and the resulting large nuclei give adverse effects on electrical characteristics as they cannot be removed by post-treatment. Even if ash as measured by burning polypropylene in air is 40 ppm by weight or less, electrical characteristics are adversely affected as long as the content of titanium out of the ash is 1 ppm by weight or higher based on the weight of the polypropylene. Where the activity of the catalyst is not very high, the content of the catalyst residue can be lowered by washing the resulting polymer. Even in such a case, the existence of titanium in an agglomerated form still affects electrical characteristics even if it remains at a very low concentration.

In the polymeric material according to the present invention, the content of ash in the polypropylene is not higher than 40 ppm by weight, preferably 20 ppm by weight or lower, more preferably 15 ppm by weight or lower. When the content of ash exceeds 40 ppm by weight, stretching breakage takes place or voids are formed when formed into fibers or a film. Insulating characteristics are deteriorated accordingly.

Different from the conventional practice that polypropylene obtained in a low yield based on titanium upon polymerization is used as a raw material and post treatment is then applied to eliminate catalyst residue to an extremely low level, the present invention is not inconvenienced or otherwise troubled even when the content of ash is higher than that required for the conventional practice. The present invention therefore makes it possible to simplify the post-treatment and has significant industrial benefit.

In the polymeric insulating material according to this invention, the polypropylene contains boiling n-heptane soluble matter in an amount not smaller than 1 wt. % but not greater than 10 wt. %, preferably not smaller than 1.0 wt. % but not greater than 9.0 wt. %, more preferably not smaller than 1.5 wt. % but not greater than 8.5 wt. %. The term "boiling n-heptane soluble matter" as used herein means the amount of n-heptane soluble matter, which has been obtained by extracting 2 g of polypropylene for 6 hours in boiling n-heptane by a Soxhlet extractor, as expressed in terms of weight percent on the basis of the amount of the polypropylene so charged. Where the content of boiling n-heptane soluble matter is less than 1 wt. %, the polypropylene has an excessively high polymerization degree so that a product formed therefrom tends to become harder. Such polypropylene has poor formability and can provide only formed products of poor electrical insulation characteristics. Different from the conventional findings, polypropylene useful in the practice of the present invention is not deteriorated in electrical insulation characteristics after it is formed into an article but conversely exhibits better stretchability and brings about preferred results even when its percent remainder subsequent to extraction in boiling n-heptane is in a range of 95 to 90 wt. %.

Further, the isotactic pentad fraction of such boiling n-heptane insoluble matter is at least 0.900, preferably at least 0.92, more preferably at least 0.950.

In the present invention, the content of chlorine in the polypropylene is not higher than 2 ppm by weight, preferably 1 ppm by weight or less. Ionic impurities are known to give deleterious effects to electrical characteristics. In particular, chlorine is known to give significant effects even when contained in a trace amount, as disclosed inter alia in Japanese Patent Laid-Open Nos. 113548/1987, 254749/1989, 166955/1989 and 150443/1990 referred to above. These prior art publications however do not contain any disclosure about electrical insulating property although reduction of the chlorine content to less than 10 ppm is disclosed to be effective for the dielectric loss factor. Incidentally, a relationship between the content of chlorine in a polymer and the electrical insulating property of the polymer has been found to vary significantly across the chlorine content of 2 ppm by weight in the polymer. Described specifically, the insulation characteristics are deteriorated when the chlorine content exceeds 2 ppm by weight but are substantially improved when the chlorine content becomes 2 ppm by weight or less. Polymerization catalysts, which are to be described later, contain chlorine in a high proportion. Where the content of chlorine in a polymer is still high even after the chlorine has been washed, it is preferred to subject the polymer to dechlorination with an amine compound, an epoxy compound, ammonia or an organic fatty acid so that the content of chlorine in the polymer is lowered to 2 ppm by weight or less.

Among such dechlorination treatments, dechlorination making use of an epoxy compound is particularly preferred. As the epoxy compound, an alkylene oxide such as ethylene oxide, propylene oxide, butene oxide or cyclohexene oxide, glycidyl alcohol, glycidic acid, a glycidyl ester, or the like can be suitably used. Upon conducting dechlorination of a polymer with such an epoxy compound, it is very effective to additionally use a compound containing OH group in at least an equimolar amount to the epoxy compound. Illustrative OH-containing compounds include water and alcohol compounds. The epoxy compound can be used in at least an equimolar amount to the chlorine contained in the polymer, preferably in a molar amount 2 to 10,000 times, more preferably 10 to 1,000 times as much as the chlorine. No particular limitation is imposed on the manner of dechlorination of a polymer with an epoxy compound so that the dechlorination can be conducted by either a batch method or a flow method. In essence, it is sufficient as long as chlorine and these compounds are allowed to contact each other to facilitate the occurrence of a reaction. Although no particular limitation is imposed on the temperature of the dechlorination either, it is generally sufficient when the temperature falls within the range of from room temperature to the melting point of the polymer. The preferred temperature may range from 50° C. to 100° C. The treatment period for conducting the dechlorination is the time required to bring the dechlorination reaction with the epoxy compound to completion. This time generally ranges from 10 seconds to 1 hour, preferably from 1 minute to 30 minutes. Further, it is preferred to take the reaction product out of the reaction system. It can be taken out of the reaction system by reducing the pressure in the reaction system or causing air or nitrogen to flow through the reaction system.

Where the yield of polypropylene per unit amount of a catalyst is low, it is necessary to conduct post-treatment to eliminate catalyst residue. Where a catalyst has high activity, it is also preferred to apply post-treatment to eliminate catalyst residue even if the yield of a polymer is high. Post-treatment can be conducted by washing polypropylene, which has been obtained by polymerization, with liquefied propylene, butane, hexane, heptane or the like. It is also practiced to add water, an alcohol compound, a ketone compound, an ether compound, an ester compound, an amine compound, an organic acid compound, an inorganic acid or the like upon post-treatment so that catalyst components such as titanium and magnesium can be solubilized to facilitate their extraction. It is also preferred to wash polypropylene with a polar compound such as water or an alcohol.

The above dechlorination can be effected before, during or after the washing described above. When conducting the dechlorination before, during or after the washing, the amine compound, the epoxy compound, ammonia or the organic fatty acid is added to the mixture of the polymer and the washing solvent to thoroughly bring it into contact with the polymer. As an alternative, it is also preferred to bring such a compound in a gaseous form into contact with the polymer subsequent to removal of the washing solvent. As a further alternative, it is also preferred to add such a compound to an extruder when the polymer obtained is added with a stabilizer and then formed into pellets by the extruder.

The term "polypropylene" as used herein embraces not only homopolymer of propylene but also random copolymers or block copolymers with one or more other unsaturated hydrocarbons or unsaturated silane compounds. Illustrative of such other unsaturated hydrocarbons include ethylene, 1-butene, 1-pentene, 3-methylpentene-1, 1-pentene, 3-methylbutene-1, 1-hexene, 4-methylpentene-1, 5-ethylhexene-1, 1-octene, 1-decene, 1-dodecene, vinylcyclohexene, styrene, allylbenzene, cyclopentene, norbornene, 5-methyl-2-norbornene, whereas exemplary unsaturated silane compounds include allylsilane. To control the amount of boiling n-heptane soluble matter within the range of from 1 wt. % to 10 wt. % in these copolymers, it is preferred to limit the proportion of co-monomer(s) other than propylene to less than 10 wt. % in random copolymerization or to make the proportion of polymerized units of propylene alone amount to at least 50 wt. % of the whole copolymer in block copolymerization.

It is also possible to use polypropylene as a polyblend with one or more other polymers. Illustrative polyblends include polyblends of polypropylene and poly-α-olefins such as polybutene, polypentene, polyhexene, polyheptene and polyoctene or cyclic polyolefins such as polycyclopentene and polynorbornene; and polyblends of copolymer between propylene and olefins having 2–20 carbon atoms and the above-described other polymers. In each of these polyblends, it is preferred to limit the proportion of polymer(s) other than polypropylene to a level not greater than 30 wt. % in the polyblend.

As the catalyst usable for the production of the polypropylene in this invention, any catalyst can be used as long as it is generally used for the industrial production of polypropylene. Illustrative usable catalysts include a combination of titanium trichloride and an organoaluminum compound as well as a combination of titanium trichloride or tetrachloride supported on a carrier such as a magnesium halide and an organoaluminum compound.

As the titanium catalyst in the catalyst system for the production of polypropylene, it is preferred to use a catalyst which has high activity and inherently contains titanium in a small amount. Among the titanium catalysts exemplified above, it is preferable to use catalyst composed of titanium trichloride or titanium tetrachloride supported on a carrier such as a magnesium halide rather than titanium trichloride.

Among these, preferred is a catalyst composed of a transition metal catalyst component supported on a magnesium halide carrier, an organoaluminum compound and an external electron-donating compound, said transition metal catalyst component being composed of a compound containing a C—O or C—N bond, as an internal electron-donating compound, and a tetravalent titanium compound containing at least one halogen atom.

In such a catalyst, usable examples of the magnesium halide include magnesium chloride, and magnesium bromide; their complexes with ethers or monoesters; and a eutectic mixture of magnesium chloride and magnesium bromide. Preferred examples of the compound containing a C—O or C—N bond, said compound being used as an internal electron-donating compound, include esters, ethers, orthoesters, and alkoxysilicon compounds. Among these, ester compounds of aromatic acids such as benzoate esters and phthalate esters are preferred. In particular, esters of phthalic acid and alcohols having 1–12 carbon atoms are employed preferably.

As the halides of tetravalent titanium, chlorine can be mentioned as a preferred halogen. Although tetravalent titanium halides in which some of the halogen atoms have been replaced by a corresponding number of alkoxyl group(s) can be used, titanium tetrachloride is used most preferably. The ester of the aromatic acid and the titanium halide can be used at a molar ratio of from 0.3:1 to 1:0.3, preferably from 0.5:1 to 1:0.5. The ratio of the titanium halide to the magnesium halide may preferably range from about 1:0.001 to about 1:0.5 by weight.

Usable examples of external electron-donating compounds include esters, ethers, orthoesters and alkoxysilicon compounds. Specific examples include the esters of benzoic acid or nucleus-substituted benzoic acids with alcohols having 1–10 carbon atoms as well as alkoxysilanes.

Usable alkoxysilanes include those exemplified by the following general formula:

$$R_xSi(OR')_{4-x}$$

in which R is an alkyl group having 3–12 carbon atoms, R' is an alkyl group having 1–12 carbon atoms and x stands for 1, 2 or 3.

Preferred external electron-donating compounds include, for example, methyltrimethoxysilane, ethyltriethoxysilane, t-butyltrimethoxysilane, vinyltriethoxysilane, phenyltrimethoxysilane, diphenyldimethoxysilane, phenylmethyldimethoxysilane, cyclohexylmethyldimethoxysilane, dicyclohexyldimethoxysilane, 2-norbornanetriethoxysilane, 2-norbornanemethyldimethoxysilane, dicyclopentyldimethoxysilane, cyclopentylmethyldimethoxysilane, cyclopentyldimethylmethoxysilane, tricyclopentylmethoxysilane, diisopropyldimethoxysilane, t-butylmethyldimethoxysilane and di-n-propyldimethoxysilane. More preferably, diphenyldimethoxysilane, cyclohexylmethyldimethoxysilane, dicyclohexyldimethoxysilane, dicyclopentyldimethoxysilane, diisopropyldimethoxysilane, t-butylmethyldimethoxysilane, di-n-propyldimethoxysilane and the like are used.

Preferred examples of the organoaluminum compounds include trialkyl aluminum compounds such as trimethyl aluminum, triethyl aluminum, tripropyl aluminum and tributyl aluminum; alkyl aluminum halides obtained by substituting one or two chlorine or bromine atoms for a like number of hydrocarbon residues, for example, dialkyl aluminum chlorides such as diethyl aluminum chloride, dipropyl aluminum chloride and dihexyl aluminum chloride; and combinations thereof.

The organoaluminum compound and the external electron-donating compound can be used, respectively, at a molar ratio of from 1 to 10,000, generally from 1 to 1,000, per mole of the titanium in the transition metal catalyst component.

Any known method can be used for the preparation of the titanium halide catalyst component carried on the magnesium halide and no particular limitation is imposed thereon. Preferred are however catalysts having high activity, especially those capable of producing polypropylene in an yield of at least 1,000,000 g/g-Ti, notably at least 3,000,000 g/g-Ti upon polymerization.

These carried catalysts have high activity. Since magnesium chloride as the carrier is soft, it is dispersed as fine particles after polymerization and does not cause agglomeration of titanium. The carried catalysts are therefore preferred.

Upon polymerization, the temperature and pressure generally range from room temperature to 150° C. and normal pressure to 100 kg/cm², respectively. Conventional polymerization processes are used including solution polymerization, bulk polymerization and vapor-phase polymerization. To improve the yield per titanium and to satisfy the requirement for the yield of at least 300,000 g/g-Ti specified in the present invention, bulk polymerization or vapor-phase polymerization is preferred.

Known methods can be used for the above-mentioned quantitation of ash, titanium and chlorine. As a method for measuring ash, for example, about 1 to 100 g of a sample is furnished and is then caused to burn in a platinum, silica or porcelain crucible or bowl. Further, the resulting carbon is completely burnt in an electric furnace at about 800° C. and, after the weight of the crucible has become constant, the weight of the ash still remaining therein is determined and the weight percentage of the ash is then calculated on the basis of the sample. The composition of the ash is thereafter determined by an ordinary analytical method such as atomic absorption spectrometry, fluorescent X-ray analysis or colorimetry.

Illustrative methods for the quantitation of chlorine, on the other hand, include colorimetry, coulometry, ion chromatography, fluorescent X-ray analysis and radioactivation analysis. According to colorimetry, sodium stearate is added to a sample, followed by vaporization without burning. Subsequent to ashing, chlorine collected as NaCl is extracted with water and is then quantitated by colorimetry while using mercuric thiocyanate. According to coulometry, a sample is caused to burn in a stream of a mixed gas of argon gas and oxygen gas. Resulting chlorine ions are titrated with silver ions produced coulometrically. According to ion chromatography, a sample is caused to burn in a similar manner and chlorine ions so formed are quantitated by ion chromatograph. According to fluorescent X-ray analysis, a sample which has been formed into a plate or tablet is exposed to X-rays, and quantitation is conducted based on the intensity of the resulting fluorescent X-rays. According to radioactivation analysis, a sample is irradiated with thermal neutrons, and the radioactivity of chlorine radionuclides formed by nuclear reactions is measured.

As preferred utility of the present invention, a stretched film as an electrical insulating film can be mentioned. Properties of the stretched film are significantly affected by the properties of the raw film, that is a film extruded as a raw material. A stretched film as an electrical insulating film is required to have a high dielectric breakdown voltage. To meet this requirement, it is necessary to make foreign particles fewer in the film. To achieve this, it is essential to make the number of foreign particles smaller in the extruded raw film as a raw material. These foreign particles are formed primarily from catalyst residue. They can be counted by carefully observing each extruded raw film through a microscope.

As a method for counting the number of foreign particles in a raw film, a microscope can be used to count the number of foreign particles. It is however very difficult to directly find out foreign particles of about 1 μm through a microscope. Accordingly, the raw film is stretched further into a biaxially-stretched thin film so that voids are formed centering around foreign particles. By this operation, the size of each void is increased centering around the nucleus of the foreign particle to a size proportional to the draw ratio. The void therefore becomes readily noticeable. The foreign particle is contained in the void so that observation of the void in further detail makes it possible to find out the foreign particle. Described specifically, a raw film of 140 μm in thickness is produced from polypropylene as a sample through a double-deck T-die of 20 mm in diameter. After preheating the raw film at 145° C. for 1 minute, the raw film is sequentially stretched fivefold in the machine direction and then sevenfold in the transverse direction at a stretching speed of 15 cm/sec. Using a phase-contrast microscope, the film so formed is observed to find out voids of 1 μm or greater. These voids are observed carefully to measure the size of solid foreign particles situated therein as nuclei. The number of foreign particles per unit area is then calculated to record the number of foreign particles of 1 μm or greater in diameter contained per cubic centimeter of an extruded raw film.

In the present invention, the number of foreign particles of from 1 μm to 10 μm in diameter contained per cubic centimeter in an extruded raw film is preferably 6,000 or less, more preferably 5,000 or less. Existence of foreign particles having a diameter greater than 10 μm is not preferred.

As these foreign particles are not only those derived from catalyst residue but also those mixed in the polymerization process or during forming a film, it is necessary to avoid such mixing as much as possible.

In the present invention, the above polypropylene can be formed into a polymeric insulating material by a method known per se in the art. According to the present invention, it is also possible to improve the dielectric breakdown resistance of the polypropylene further by adding an inorganic oxide or hydroxide which has an average particle size not greater than 1 μm and is free of particles having a particle size of 10 μm or greater, an organopolysilane, maleic-anhydride-grafted polypropylene, or a silane compound containing one or more organic polyether groups.

It has heretofore been considered necessary to reduce impurities such as an inorganic compound to an extremely low level in order to use polypropylene as a polymeric insulating material. Complex post-treatment has hence been applied to eliminate ash from polypropylene obtained by polymerization, so that production processes of extremely high cost have been used. In the present invention, however, the addition of one or more of the above-described specific compounds has surprisingly been found to conversely improve the dielectric breakdown resistance further.

It has not been ascertained yet why the dielectric breakdown resistance is improved by the addition of such an additive. These minute compounds may probably be considered to have the effect of trapping electrons or, in contrast, to have electrons dispersed. These additives are effective not only in improving dielectric breakdown voltage but also in imparting the property that the dielectric breakdown voltage does not drop even at high temperatures. Although the dielectric breakdown voltage of a biaxially-stretched polypropylene film is generally measured around room temperature, the film is known to have the drawback that its dielectric breakdown voltage, for example, at 80° C. to 100° C. is considerably lower compared with the voltage measured around room temperature. A capacitor is charged and discharged repeatedly, so that heat is produced. In actual use, the temperature therefore becomes substantially higher than room temperature. In this case, the dielectric breakdown voltage of a capacitor using a biaxially-stretched polypropylene film is reduced by a temperature increase so that adverse effects are given to the performance of the capacitor. Although the insulating polypropylene material according to this invention has excellent properties by itself, its heat resistance can be substantially improved by the addition of the organopolysilane, maleic-anhydride-grafted polypropylene or organic-polyether-group-containing silane compound.

The present invention also provides polymeric insulating materials having a high dielectric breakdown voltage, which have been obtained by adding to these polymeric insulating materials an inorganic oxide or hydroxide in an amount not smaller than 1 ppm by weight but not greater than 10 wt. %, preferably not smaller than 30 ppm by weight but not greater than 5 wt. %, more preferably from 100 ppm by weight to 5 wt. %. Here, the inorganic oxide or hydroxide can be the oxide or hydroxide of magnesium, aluminum or iron having an average particle size not greater than 1 μm, more preferably of 0.1 μm or smaller and containing no particles of 10 μm or greater. Although the mechanism of the effects available by the addition of these compounds have not been elucidated yet, these compounds have effect of improving electrical insulating property.

The oxides or hydroxides of magnesium, aluminum and iron are produced industrially and are available in the form of powder. Those having an average particle size greater than the above value can be used by grinding and/or classifying them. Those surface-treated to improve the dispersibility can also be used.

To provide increased dispersibility, it is also possible to first disperse a magnesium, aluminum or iron compound having good dispersibility in propylene beforehand and then to convert the magnesium, aluminum or iron compound into the magnesium, aluminum or iron oxide or hydroxide.

Described specifically, a compound such as a halide, the sulfate or an organic acid salt of magnesium, aluminum or iron can be converted into the corresponding hydroxide or oxide by contacting the compound to react with an alkali or an amine compound, an oxylane compound, ammonia or the like. The above reaction can be conducted either in a liquid phase or in a vapor phase.

The present invention also provides polymeric insulating materials having a high dielectric breakdown voltage and obtained by adding a high-molecular compound such as an organopolysilane, maleic-anhydride-grafted polypropylene or a silane compound containing one or more organic polyether groups in an amount not smaller than 50 ppm by weight but not greater than 10% by weight, preferably not smaller than 100 ppm by weight to 5% by weight to the above polymeric insulating materials.

Examples of the organopolysilane include homopolymers, copolymers and terpolymers of organopolysilanes whose backbones are formed of silicon atoms as represented by the following formula (1):

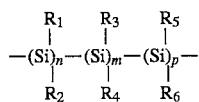
(1)

wherein $R_1$, $R_2$, $R_3$, $R_4$, $R_5$ and $R_6$ individually represent a hydrogen atom or an alkyl, aryl, alkoxyl or silylalkyl group, and n, m and p stands for integers which indicate the proportions of the corresponding monomer units in the polymer compound, include 0 and satisfy the following inequality: $n+m+p \geq 3$.

These organopolysilanes are produced industrially. They can also be produced by subjecting silane dihalides to dehalogenopolycondensation in the presence of sodium or the like, polymerizing disilylene compounds or cyclic silane compounds, or subjecting monosilanes to dehydropolycondensation in the presence of a transition metal compound.

Specific examples include polyphenylmethylsilane, polydiphenylsilane, polyphenylmethyl-co-dimethylsilane, polyphenylethylsilane, polydihexylsilane, polyphenylmethyl-co-diphenylsilane, polypropylmethylsilane, polydipentylsilane, polydi-t-butyl-co-dimethylsilane, polybutylmethylsilane, polydibutylsilane, polypentylmethylsilane, polydioctylsilane, polydodecylmethylsilane, polytrimethylsilylmethylsilane, polytrimethoxysilylmethylsilane, polyphenylsilane, polycyclohexylmethylsilane, polycyanoethylmethylsilane, poly(2-acetoxyethylmethylsilane), and poly(2-carbomethoxyethylmethylsilane).

No particular limitation is imposed on the manner of mixing the organopolysilane compound with polypropylene. For example, they can be simply molten and mixed together. As an alternative, it is possible to polymerize propylene in the presence of a catalyst containing the organopolysilane so that the organopolysilane can be dispersed in the resulting polypropylene. As another alternative, a master batch containing the organopolysilane at a high concentration is prepared and, when needed, the master batch is then diluted to a suitable concentration with another polyolefin.

The proportion of the organopolysilane based on the polypropylene preferably ranges from 50 ppm by weight to 10% by weight, more preferably from 100 ppm by weight to 5% by weight. Proportions smaller than 50 ppm by weight cannot bring about the effects of the organopolysilane fully. Even if the proportion exceeds 10% by weight, the effects of the organopolysilane are not enhanced significantly but, when formed into fibers or a film, such an unduly high proportion induces stretching breakage or voids and may deteriorate insulating characteristics. It is therefore not preferred to use the organopolysilane in a proportion outside the above range.

The maleic-anhydride-grafted polypropylene useful in the present invention is produced industrially and is available in various grades. It can also be produced by adding maleic anhydride together with a radical initiator to polypropylene and then heating the resultant mixture.

The graft ratio of maleic anhydride contained in the maleic-anhydride-grafted polypropylene preferably ranges from 0.1% to 25%. No particular limitation is imposed on the manner of mixing the maleic-anhydride-grafted polypropylene with polypropylene. For example, they can be simply molten and mixed together. As an alternative, a master batch containing the maleic-anhydride-grafted polypropylene at a high concentration is prepared and, when needed, the master batch is then diluted to a suitable concentration with another polyolefin.

The proportion of the maleic-anhydride-grafted polypropylene based on the polypropylene ranges from 50 ppm by weight to 10% by weight, preferably from 100 ppm by weight to 5% by weight although the proportion varies depending upon the graft ratio of the maleic-anhydride-grated polypropylene. Proportions smaller than 50 ppm by weight cannot bring about the effects of the maleic-anhydride-grafted polypropylene fully. Even if the proportion exceeds 10% by weight, the effects of the maleic-anhydride-grafted polypropylene are not enhanced significantly but, when formed into fibers or a film, such an unduly high proportion induces stretching breakage or voids and may deteriorate insulating characteristics. It is therefore not preferred to use the maleic-anhydride-grafted polypropylene in a proportion outside the above range.

The silane compound containing one or more organic polyether groups can be represented, for example, by the following formula (2):

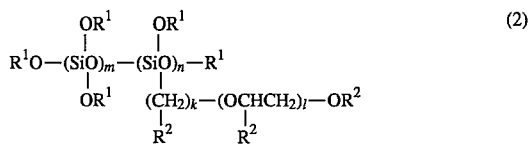

wherein $R^2$s are the same or different and individually represent a hydrocarbon residuum, $R_2$s are the same or different and individually represent a hydrocarbon residuum, n and m represent the proportions of the corresponding parenthesized structural units, respectively, and m is 0 or a natural number, n is a natural number of at least 1, m+n ranges from 1 to 1,000, k is 0 or a natural number and l is a natural number of at least 1.

These polyether-containing silane compounds are produced industrially and are readily available on the market. Specific examples include tris(2-methoxyethoxy)vinylsilane, tris(2-methoxyethoxy)methylsilane, trimethoxysilyl(polyether), and polyether-modified silicone oils.

No particular limitation is imposed on the manner of mixing the polyether-containing silane compound with polypropylene. For example, they can be simply molten and mixed together. As an alternative, it is possible to polymerize propylene in the presence of a catalyst containing the polyether-containing silane compound so that the polyether-containing silane compound can be dispersed in the resulting polypropylene. As another alternative, a master batch containing the polyether-containing silane compound at a high concentration is prepared and, when needed, the master batch is then diluted to a suitable concentration with another polyolefin.

The proportion of the polyether-containing silane compound based on the polypropylene preferably ranges from 50 ppm by weight to 10% by weight, more preferably from 100 ppm by weight to 5% by weight. Proportions smaller than 50 ppm by weight cannot bring about the effects of the polyether-containing silane compound fully. Even if the proportion exceeds 10% by weight, the effects of the polyether-containing silane compound are not enhanced significantly but, when formed into fibers or a film, such an unduly high proportion induces stretching breakage or voids and may deteriorate insulating characteristics. It is therefore not preferred to use the polyether-containing silane compound in a proportion outside the above range.

The polymeric insulating material of the present invention is used in the form of formed articles. Especially, it can be employed in the form of fibers or films. These formed articles are preferably used as unstretched films, uniaxially-stretched films, and biaxially-stretched films. One embodiment of the present invention is a formed polypropylene article which has high electrical insulating property and is obtained by stretching the above polymeric insulating material in at least one direction. Another embodiment of the present invention is an electrical insulating film obtained by biaxially stretching the above polymeric insulating material. Stretching of a film can be effected in a manner known per se in the art and no particular limitation is imposed thereon. Usable stretching methods include, as uniaxial stretching methods, usual uniaxial stretching and roll stretching and, as biaxial stretching methods, inflation stretching in which a film is stretched in both the machine direction and the transverse direction at the same time and tentering in which a film is successively stretched in the machine direction and the transverse direction.

In tentering, for example, a molten film melt-extruded from a T die is solidified through cooling rolls and, subsequent to preheating, if needed, the melt-extruded film is introduced into a stretching zone and is then stretched 1.5-fold to 8-fold in the machine direction at 120°–150° C. This draw ratio can range from 1.5-fold to 8-fold, preferably from 2-fold to 7-fold. Draw ratios smaller than 1.5-fold are too small to enhance the strength of the film. Draw ratios greater than 8-fold, on the other hand, tend to form voids in the film, reduce the strength in the transverse direction and render the film susceptible to longitudinal tearing. Next, the film is stretched further 6-fold to 12-fold in the transverse direction at 140°–170° C. Finally, the film so stretched biaxially can be subjected to heat setting at 160°–190° C., if necessary.

Polymeric insulating materials according to the present invention themselves are materials having very high electrical insulating property. Formed articles obtained using such polymeric insulating materials, especially stretched formed articles such as films and fibers exhibit, as a characteristic feature thereof, extremely high electrical insulating property. In particular, biaxially-stretched films also have high mechanical strength and can be produced with a varied thickness, thereby permitting production of films ranging from thin films to thick films. The polymeric insulating materials according to the present invention exhibit better electrical characteristics than conventional materials, especially when formed into thin films of 20 μm or less, notably when formed into biaxially-stretched films having a thickness of 10 μm or less, preferably in the range of from 1 μm to 6 μm.

Upon production of the formed article according to the present invention, the polypropylene useful in the practice of the present invention can be added with various stabilizers or additives which are employed in ordinary propylene.

In this invention, each dielectric breakdown voltage was measured by the following method.

A d.c. dielectric strength testing apparatus manufactured by KASUGA DENKI K.K. was used. Following JIS-2330, the range was set to 20 KV, a voltage was applied across a film at a voltage increment of 100 V/sec to measure its dielectric breakdown voltage, and the voltage resistant characteristics of the film were then determined. The dielectric breakdown voltage is a value obtained by dividing the measured value (V) of the dielectric breakdown voltage with the thickness (μm) of the film.

As a film for use in the measurement, a biaxially-stretched film of 4 μm in thickness was prepared by extruding polypropylene pellets at 270° C. into a sheet-like film of 140 μm in thickness and then stretching the sheet-like film first 5-fold in the machine direction and then 7-fold in the transverse direction at 150° C. on a biaxial stretching machine manufactured by T.M. Long Corp. The biaxially-stretched film was then cut into square test pieces of 150 mm×150 mm. Fifty test pieces were measured with the location of measurement being limited to one location per test piece.

The measurement was conducted as will be described next. Employed as an upper electrode, i.e., a (+) electrode was a well-polished, brass-made cylindrical rod having a diameter of 25 mm and chamfered at a radius of curvature of 3 mm. As a lower electrode, i.e., a (−) electrode, a rubber-made, elastic plate having a Shore hardness of 60–70 was placed on a metal plate which was about 150 mm×150 mm wide and 30 mm thick. An aluminum foil which is specified under JIS-H-4160 and was at least 0.007 mm thick and 80 mm wide was wound around the elastic plate and the metal plate.

The present invention will hereinafter described further by the following Examples.

EXAMPLE 1

Provided was an oscillating mill equipped with four grinding pots, each of which contained 9 kg of steel balls of 12 mm in diameter and had an internal capacity of 4 liters. In a nitrogen atmosphere, 300 g of magnesium chloride, 75 ml of diisobutyl phthalate and 60 ml of titanium tetrachloride were charged in each pot and were ground for 40 hours.

Ten grams of the co-ground mixture so obtained were placed in a 200-ml flask, to which 60 ml of toluene were added. The resulting mixture was stirred at 114° C. for 30 minutes and then permitted to settle. The supernatant was decanted. The solid matter was then washed three times with 100-ml portions of n-heptane at 20° C. The solid matter was then dispersed in 100 ml of n-heptane to provide a slurry of a solid catalyst component. The solid catalyst component so obtained contained 1.9 wt. % of titanium and 14.2 wt. % of diisobutyl phthalate.

Provided next was an autoclave which had an internal capacity of 70 liters and had been fully dried and then purged with nitrogen gas. Then, 2 ml of triethyl aluminum, 0.8 ml of di-n-propyldimethoxysilane and 150 mg of the above-described transition metal catalyst component, all diluted together in 1000 ml of heptane, were charged in the autoclave. The autoclave was charged further with 20 kg of propylene and 17 Nl of hydrogen, followed by polymerization at 70° C. for 2 hours. After the polymerization, unreacted propylene was separated by decantation and the polymerization product was washed with liquefied propylene three times. Then the polymerization product was treated with 0.2 g of water and 10 ml of propylene oxide at 90° C. for 15 minutes and dried under reduced pressure for 5 minutes. This propylene oxide treatment was repeated three times. The polymer so produced was then taken out and weighed. Polypropylene was obtained in an amount of 13.45 kg. The yield of the polyethylene per titanium in the above polymerization was 4,720,000 g/g-Ti.

The intrinsic viscosity (hereinafter abbreviated as "η") of the polypropylene as measured in a tetraline solution of 135° C. was 1.65. Its percent remainder of boiling n-heptane extraction as measured by a Soxhlet extractor (the weight of the polymer remaining after the extraction/the weight of the polymer before the extraction, as expressed in terms of percentage; will hereinafter be abbreviated as "II") was 98.1%. The ratio of its weight average molecular weight to its number average molecular weight as measured by gel permeation chromatography while using as a solvent 1,2,4-trichlorobenzene of 135° C. (hereinafter abbreviated as "MW/MN") was 5.5.

To 100 parts by weight of the polypropylene obtained above, 0.2 part by weight of "Irganox-1330" (trade name; product of Ciba-Geigy Ltd.) and 0.002 part by weight of calcium stearate were mixed, followed by pelletization at 250° C.

To measure the content of ash in the propylene, 20 g of the pellets were placed as a sample in a porcelain crucible and were then ashed while avoiding abrupt burning. The crucible was then placed in an electric furnace of 850° C., whereby the sample was completely ashed. The crucible with the ash contained therein was allowed to cool down in a dry desiccator and the ash was weighed. The content of ash in the pellets was hence found to be 14 ppm by weight. The ash was analyzed further so that the contents of titanium and calcium in the pellets were found to be 0.2 ppm and 1.3 ppm, respectively. Further, the content of chlorine in the pellets obtained in this Example was 0.31 ppm.

The pellets were next extruded at 270° C., whereby sheet-like films of 140 μm and 525 μm in thickness, respectively, were obtained. Using the biaxial stretching machine manufactured by T.M. Long Corp. those films were stretched first 5-fold in the machine direction and then 7-fold in the transverse direction so that biaxially-stretched films of 4 μm and 15 μm in thickness, respectively, were obtained. When the sheet-like film of 140 μm in thickness was stretched, the stretching stress was 35 kg/cm$^2$ upon initiation of the stretching in the transverse direction and 42 kg/cm$^2$ when stretched 7-fold. The dielectric breakdown voltages of those films were 610 V/μm and 725 V/μm, respectively. They had the same tan δ, which was 0.001.

A 100-cm$^2$ piece of the stretched film of 4 μm in thickness was inspected through a phase-contrast microscope to observe voids of 1 μm or greater, whereby the size and number of solid foreign particles contained as nuclei in such voids were determined. Sixty foreign pieces not smaller than 1 μm but not greater than 5 μm (1,500 foreign pieces when converted to the number per cubic centimeter) were contained, and no foreign pieces greater than 5 μm were contained.

Further, the dielectric breakdown voltage at 80° C. of the film of 4 μm in thickness was 534 V/μm.

EXAMPLE 2

Anhydrous magnesium chloride (300 g), 1.6 l of kerosine, and 1.5 l of 2-ethylhexyl alcohol were heated at 140° C. for 3 hours into a homogeneous liquid mixture. The liquid mixture was added with 70 g of phthalic anhydride, followed by stirring at 130° C. for 1 hour so that phthalic anhydride was dissolved. The mixture so formed was allowed to cool to room temperature. The liquid mixture whose temperature had dropped to room temperature was slowly added dropwise to 8.5 ; of titanium tetrachloride which was cooled at −20° C. After the completion of the dropwise addition, the mixture was heated to 110° C. and 215 ml of diisobutyl phthalate were then added, followed by stirring for further 2 hours. Solid was collected by hot filtration. The solid so obtained was suspended again in 10 l of titanium tetrachloride, followed by stirring again at 110° C. for 2 hours. Solid was collected by hot filtration. The thus-obtained solid was washed with n-heptane until no titanium was practically detected in the washing. The solid catalyst component so obtained contained 2.3 wt. % of titanium and 11.6 wt. % of diisobutyl phthalate.

Polymerization was then conducted in the same manner as in Example 1 except for the use of 4 ml of triethyl aluminum, 1.6 ml of di-n-propyldimethoxysilane and 300 mg of the above solid catalyst component, all diluted together in 1000 ml of heptane, as a catalyst. As a result of the polymerization, polypropylene was obtained in an amount of 9.97 kg. The yield of the polypropylene per titanium in the above polymerization was 1,450,000 g/g-Ti.

The polypropylene was post-treated in a similar manner as in Example 1, whereby polypropylene powder was obtained. η of the polypropylene powder was 1.70, II: 98.3%, MW/MN: 5.1, ash: 33 ppm by weight, titanium: 7 ppm, and chlorine: 0.53 ppm.

From the polypropylene powder, biaxially-stretched films of 4 μm and 15 μm in thickness, respectively, were produced in the same manner as in Example 1. The dielectric breakdown voltages of those films were 600 V/μm and 710 V/μm, respectively. They had the same tan δ, which was 0.001.

A 100-cm² piece of the stretched film of 4 μm in thickness was inspected through the phase-contrast microscope to observe voids of 1 μm or greater, whereby the size and number of solid foreign particles contained as nuclei in such voids were determined. One hundred twenty foreign pieces not smaller than 1 μm but not greater than 5 μm (3,000 foreign pieces when converted to the number per cubic centimeter) and 5 foreign pieces greater than 5 μm (75 foreign pieces when converted to the number per cubic centimeter) were contained, and no foreign pieces greater than 10 μm were contained.

Further, the dielectric breakdown voltage at 80° C. of the film of 4 μm in thickness was 520 V/μm.

EXAMPLE 3

Polymerization was conducted in the same manner as in Example 1 except that 180 mg of the solid catalyst component, 1.5 ml of triethyl aluminum and 0.4 ml of di-n-propyldimethoxysilane were used. As a result of the polymerization, polypropylene was obtained in an amount of 15.28 kg. The yield of the polypropylene per titanium in the above polymerization was 4,470,000 g/g-Ti.

The polypropylene was post-treated in a similar manner as in Example 1, whereby polypropylene powder was obtained. η of the polypropylene powder was 1.75, II: 92.7%, MW/MN: 5.0, ash: 9 ppm by weight, titanium: 0.2 ppm, and chlorine: 0.74 ppm.

From the polypropylene powder, biaxially-stretched films were produced in the same manner as in Example 1. When the sheet-like film of 140 μm in thickness was stretched, the stretching stress was 25 kg/cm² upon initiation of the stretching in the transverse direction and 35 kg/cm² when stretched 7-fold. The stretchability was therefore very good. The dielectric breakdown voltages of those films were 640 V/μm (thickness: 4 μm) and 720 V/μm (thickness: 15 μm), respectively. They had the same tan δ, which was 0.001.

A 100-cm² piece of the stretched film of 4 μm in thickness was inspected through the phase-contrast microscope to observe voids of 1 μm or greater, whereby the size and number of solid foreign particles contained as nuclei in such voids were determined. Fifty foreign pieces not smaller than 1 μm but not greater than 5 μm (1,250 foreign pieces when converted to the number per cubic centimeter)were contained, and no foreign pieces greater than 5 μm were contained.

Further, the dielectric breakdown voltage at 80° C. of the film of 4 μm in thickness was 548 V/μm.

COMPARATIVE EXAMPLE 1

In a similar manner to Example 1 except that neither water nor propylene oxide was added after the completion of the polymerization, polypropylene was obtained in an amount of 13.2 kg (yield: 4,630,000 g/g-Ti). η of the polypropylene was 1.65, II: 98.0%, and MW/MN: 5.3. The content of ash in the polypropylene was found to be 16 ppm by weight. Quantitation of chlorine indicated 3.6 ppm by weight. The dielectric breakdown voltages of films prepared from powder of the polypropylene in a similar manner to Example 1 were 440 V/μm (thickness: 4 μm) and 635 V/μm (thickness: 15 μm), respectively.

A 100-cm² piece of the stretched film of 4 μm in thickness was inspected through the phase-contrast microscope to observe voids of 1 μm or greater, whereby the size and number of solid foreign particles contained as nuclei in such voids were determined. Eighty foreign pieces not smaller than 1 μm but not greater than 5 μm (2,000 foreign pieces when converted to the number per cubic centimeter) and 2 foreign pieces not smaller than 5 μm but not greater than 10 μm (50 foreign pieces when converted to the number per cubic centimeter) were contained, and no foreign pieces greater than 10 μm were contained.

Further, the dielectric breakdown voltage at 80° C. of the film of 4 μm in thickness was 395 V/μm.

COMPARATIVE EXAMPLE 2

Provided was an autoclave which had an internal capacity of 70 liters and had been fully dried and then purged with nitrogen gas. Heptane (1000 ml), 32 mmol of diethyl aluminum chloride, 1.4 mmol of triphenyl phosphite and, as a titanium catalyst, 1.42 g of a solid titanium trichloride catalyst (which had been obtained by reducing titanium tetrachloride with an organoaluminum compound and then activating the reduction product with di-iso-amyl ether and titanium tetrachloride) instead of the transition metal catalyst used in Example 1 were charged in the autoclave. The autoclave was charged further with 15 kg of liquefied propylene and hydrogen gas and the autoclave was heated. Polymerization was allowed to proceed under stirring for 4.5 hours while controlling the internal temperature of the autoclave at 60° C. 4.5 hours later, propylene and hydrogen gas were purged out. Then, after charging 8.5 l of methanol, 14 l of n-heptane and 200 mmol of methyl acetoacetate, the catalyst component was subjected to solubilization treatment at 110° C. for 2 hours. After decantation, the solid was washed with 10 l of water at 55° C. This procedure was repeated four times. The polypropylene so formed was collected by filtration and then dried, whereby polypropylene was obtained in an amount of 10.05 kg. The yield of the polypropylene per titanium metal in the above polymerization reaction was 21,100 g/g-Ti.

η of the polypropylene was 1.83, II: 99.3%, and MW/MN: 8.3. The content of ash in the polypropylene was found to be 5 ppm by weight. Titanium was 1.5 ppm by weight. Quantitation of chlorine indicated 3 ppm by weight. The dielectric breakdown voltages of films prepared from powder of the polypropylene in a similar manner to Example 1 were 405 V/μm (thickness: 4 μm) and 635 V/μm (thickness: 15 μm), respectively. When the sheet-like film of 140 μm in thickness was stretched, the stretching stress was 37 kg/cm² upon initiation of the stretching in the transverse direction and 47 kg/cm² when stretched 7-fold. The stretchability was poor.

A 10-cm² piece of the stretched film of 4 μm in thickness was inspected through the phase-contrast microscope to observe voids of 1 μm or greater, whereby the size and number of solid foreign particles contained as nuclei in such voids were determined. Twenty-five foreign pieces not smaller than 1 μm but not greater than 5 μm (6,250 foreign pieces when converted to the number per cubic centimeter) and 7 foreign pieces not smaller than 5 μm but not greater than 10 μm (1,750 foreign pieces when converted to the number per cubic centimeter) were contained, and two foreign pieces greater than 10 μm (500 foreign pieces when converted to the number per cubic centimeter) were also contained.

Further, the dielectric breakdown voltage at 80° C. of the film of 4 μm in thickness was 320 V/μm.

COMPARATIVE EXAMPLE 3

Provided was an autoclave which had an internal capacity of 20 liters and had been fully dried and then purged with nitrogen gas. Heptane (10 l), 30 mmol of diethyl aluminum chloride and, as a titanium catalyst, 2.5 g of a solid titanium trichloride catalyst (which had been obtained by reducing titanium tetrachloride with metal aluminum and activated)

instead of the transition metal catalyst employed in Example 1 were charged in the autoclave. After hydrogen gas was charged, the autoclave was heated. Propylene gas was charged to maintain 5 kg/cm$^2$-G at 70° C., followed by polymerization. Six hours later, the charging of propylene gas was stopped. A polypropylene slurry so obtained was transferred to an autoclave having an internal capacity of 70 l. After 4.4 l of methanol and 150 mmol of methyl acetoacetate were charged, the catalyst component was subjected to solubilization treatment at 100° C. for 2 hours. After decantation, the solid was washed with 5 l of water at 55° C. This procedure was repeated four times. The polypropylene so formed was collected by filtration and then dried so that 4.2 kg of polypropylene powder was obtained. The yield of the polypropylene per titanium metal in the above polymerization reaction was 5,040 g/g-Ti.

η of the polypropylene was 1.83, II: 97.4%, and MW/MN: 6.5. The content of ash in the polypropylene was found to be 16 ppm by weight. Titanium was 3.5 ppm by weight. Quantitation of chlorine indicated 4 ppm by weight. The dielectric breakdown voltages of films prepared from the polypropylene powder in a similar manner to Example 1 were 390 V/μm (thickness: 4 μm) and 570 V/μm (thickness: 15 μm), respectively.

A 10-cm$^2$ piece of the stretched film of 4 μm in thickness was inspected through the phase-contrast microscope to observe voids of 1 μm or greater, whereby the size and number of solid foreign particles contained as nuclei in such voids were determined. One hundred or more foreign particles not smaller than 1 μm but not greater than 5 μm (at least 25,000 foreign pieces when converted to the number per cubic centimeter) were contained. Further, 42 foreign pieces not smaller than 5 μm but not greater than 10 μm (10,500 foreign pieces when converted to the number per cubic centimeter) were also contained. Moreover, 11 foreign pieces greater than 10 μm (2,700 foreign pieces when converted to the number per cubic centimeter) were also contained.

Further, the dielectric breakdown voltage at 80° C. of the film of 4 μm in thickness was 310 V/μm.

EXAMPLE 4

The polypropylene powder obtained in Example 1 was used. To 100 parts by weight of the polypropylene powder, 0.1 part by weight of 2,6-di-t-butyl-p-cresol, 0.005 part by weight of calcium stearate and 0.2 part by weight of "Irganox 1330" (trade name; product of Ciba-Geigy Ltd.) were added and mixed. Further, 3 parts by weight of polyphenylmethyl-co-dimethylsilane ("PPS-100", trade name; product of Nisso Chemicals Co., Ltd.; copolymer of polyphenylmethylsilane dichloride and dimethylsilanedichloride at a monomer ratio of 1:1) were added. The resultant mixture was extruded at 250° C. into pellets. The pellets were then extruded at 270° C. so that a sheet-like film of 140 μm in thickness was obtained. Using the biaxial stretching machine manufactured by T.M. Long Corp., the film was stretched first 5-fold in the machine direction and then 7-fold in the transverse direction at 150° C., whereby a biaxially-stretched film of 4 μm in thickness was produced. The dielectric breakdown voltage (hereinafter abbreviated as "BDV") of the thus-obtained film was measured at 23° C. and 80° C., respectively. Its BDVs were 641 V/μm and 585 V/μm, respectively. Namely, the BDV at room temperature was very high and moreover, the degree of the reduction in BDV at the high temperature was small.

EXAMPLE 5

An experiment was conducted in a similar manner to Example 4 except that the amount of polyphenylmethyl-co-dimethylsilane was changed to 0.1 part by weight based on polypropylene. As a result, the BDVs of the thus-obtained film at 23° C. and 80° C. were 641 V/μm and 582 V/μm, respectively.

EXAMPLE 6

An experiment was conducted in a similar manner to Example 4 except that 1 part by weight of polydihexylsilane, which was synthesized by the reaction of dihexylsilane dichloride with sodium metal in toluene at its boiling temperature, was used in lieu of polyphenylmethyl-co-dimethylsilane. As a result, the BDVs of the thus-obtained film at 23° C. and 80° C. were 638 V/μm and 583 V/μm, respectively.

EXAMPLE 7

An experiment was conducted in a similar manner to Example 4 except that 1 part by weight of polymethylbutylsilane, which was synthesized by the reaction of methylbutylsilane dichloride with sodium metal in toluene at its boiling temperature, was used in place of polyphenylmethyl-co-dimethylsilane. As a result, the BDVs of the thus-obtained film at 23° C. and 80° C. were 625 V/μm and 581 V/μm, respectively.

EXAMPLE 8

To 100 parts by weight of the polypropylene powder obtained in Example 1, 0.1 part by weight of 2,6-di-t-butyl-p-cresol, 0.005 part by weight of calcium stearate and 0.2 part by weight of "Irganox 1330" (trade name; product of Ciba-Geigy Ltd.) were added and mixed. Further, 3 parts by weight of maleic-anhydride-grafted polypropylene (graft ratio of maleic anhydride: 5%) were added. The resultant mixture was extruded at 250° C. into pellets.

The pellets were then extruded at 270° C. so that a sheet-like film of 140 μm in thickness was obtained. Using the biaxial stretching machine manufactured by T.M. Long Corp., the film was stretched first 5-fold in the machine direction and then 7-fold in the transverse direction at 150° C., whereby a biaxially-stretched film of 4 μm in thickness was produced. The BDVs of the thus-obtained film at 23° C. and 80° C. were 636 V/μm and 589 V/μm, respectively. Namely, the BDV at room temperature was very high and moreover, the BDV did not show any substantial drop at the high temperature.

EXAMPLE 9

An experiment was conducted in a similar manner to Example 8 except that maleic-anhydride-grafted polypropylene (graft ratio of maleic anhydride: 8%) was used and its amount was changed to 50 ppm by weight based on the polypropylene. The BDVs of the thus-obtained film at 23° C. and 80° C. were found to be 635 V/μm and 584 V/μm, respectively.

EXAMPLE 10

An experiment was conducted in a similar manner to Example 4 except that trimethoxysilyl (polyether) was used in place of polyphenylmethyl-co-dimethylsilane and its amount was changed to 0.1 part by weight based on the polypropylene. As a result, the BDVs of the thus-obtained film at 23° C. and 80° C. were 615 V/μm and 583 V/μm,

EXAMPLE 11

An experiment was conducted in a similar manner to Example 4 except that 1 part by weight of tris(2-methoxyethoxy)methylsilane ("LS-3660" trade name: product of Shin-Etsu Chemical Co., Ltd.) was used in place of polyphenylmethyl-co-dimethylsilane. As a result, the BDVs of the thus-obtained film at 23° C. and 80° C. were 624 V/µm and 583 V/µm, respectively.

EXAMPLE 12

An experiment was conducted in a similar manner to Example 4 except that 1 part by weight of a polyether-modified silicone oil ("TSF-160", trade name: product of Toshiba Silicone Co., Ltd.) was used in place of polyphenylmethyl-co-dimethylsilane. As a result, the BDVs of the thus-obtained film at 23° C. and 80° C. were 616 V/µm and 578 V/µm, respectively.

EXAMPLE 13

An experiment was conducted in a similar manner to Example 4 except that, instead of polyphenylmethyl-co-dimethylsilane, aluminum hydroxide [which had been obtained by classifying "S-100" (trade name, product of Ishizu Seiyaku Ltd.) to eliminate particles of 10 µm and greater so that the average particle size was adjusted to 1 µm or smaller] was added in an amount to give 30 ppm by weight in the polymer. As a result, the BDV of the thus-obtained film at 23° C. was 635 V/µm.

EXAMPLE 14

An experiment was conducted in a similar manner to Example 4 except that, in lieu of polyphenylmethyl-co-dimethylsilane, magnesium hydroxide [which had been obtained by classifying "KISUMA 5A" (trade name, product of Kyowa Chemical Industry Co., Ltd.) to eliminate particles of 10 µm and greater so that the average particle size was adjusted to 1 µm or smaller) was added in an amount to give 30 ppm by weight in the polymer. As a result, the BDV of the thus-obtained film at 23° C. was 640 V/µm.

EXAMPLE 15

An experiment was conducted in a similar manner to Example 4 except that, in place of polyphenylmethyl-co-dimethylsilane iron oxide ("NANOTITE" trade mark; product of Showa Denko K.K.; ferric oxide of 0.02 µm in average particle size) was added in an amount to give 30 ppm by weight in the polymer. As a result, the BDV of the thus-obtained film at 23° C. was 655 V/µm.

EXAMPLE 16

Provided was an oscillating mill equipped with four grinding pots, each of which contained 9 kg of steel balls of 12 mm in diameter and had an internal capacity of 4 liters. In a nitrogen atmosphere, 300 g of magnesium chloride, 75 ml of diisobutyl phthalate and 20 ml of titanium tetrachloride were charged in each pot and were ground for 40 hours.

Ten grams of the co-ground mixture so obtained were placed in a 200-ml flask, to which 60 ml of toluene were added. The resulting mixture was stirred at 114° C. for 30 minutes and then left over standstill. The supernatant was decanted. The solid matter was then washed three times with 100-ml portions of n-heptane at 20° C. The solid matter was then dispersed in 100 ml of n-heptane to provide a slurry of a solid catalyst component. The solid catalyst component so obtained contained 0.1 wt. % of titanium and 14.2 wt. % of diisobutyl phthalate.

Provided next was an autoclave which had an internal capacity of 3 liters and had been fully dried and then purged with nitrogen gas. Heptane (1,000 ml) was charged in the autoclave. Further, 5 g of triethyl aluminum, 2.5 ml of cyclohexylmethyldimethoxysilane, 750 mg of the above solid catalyst component, all diluted together in 100 ml of heptane, were added. Propylene was pressurized to 5 kg/cm$^2$-G, followed by polymerization at 70° C. for 2 hours. After the polymerization, the reaction product was collected by filtration and dried at 80° C. under reduced pressure. The powder so obtained was contacted to treat at 90° C. for 15 minutes with a mixture of propylene oxide and water, the weight ratio of which being 1:0.02. Under reduced pressure, 5-minute drying treatment was repeated three times. The polymer so produced was then taken out and weighed. Polypropylene was obtained in an amount of 599 g.

η of the polypropylene was 0.83, while its ash content was 1.13 wt. %. The ash contained a mixture of magnesium oxide and magnesium hydroxide in a total amount of 230 ppm based on the weight of the polypropylene. Further, the content of chlorine was measured by radioactivation analysis. It was found to be 5.5 ppm by weight.

To 100 parts by weight of polypropylene powder obtained as in Example 1, the polypropylene powder prepared above and containing the mixture of magnesium oxide and magnesium hydroxide was added in such an amount that the concentration of magnesium became 30 ppm by weight of the whole mixture. After 0.1 part by weight of 2,6-di-t-butyl-p-cresol, 0.01 part by weight of calcium stearate and 0.2 part by weight of "Irganox-1330" (trade name; product of Ciba-Geigy Ltd.) were added, the resultant mixture was extruded at 250° C. into pellets. The amount of chlorine in the pellets were measured by radioactivation analysis. It was determined to be 0.95 ppm by weight. The dielectric breakdown voltage of a film produced from the pellets in a similar manner to Example 1 was 640 V/µm. Further, tan δ of the film was 0.001.

We claim:

1. An electrical insulating film obtained by biaxially stretching a polymeric insulating material having a high dielectric breakdown voltage, said polymeric insulating material comprising polypropylene which has been obtained in a yield of at least 300,000 g/g-Ti based on titanium in a catalyst upon polymerization, contains ash in an amount not greater than 40 ppm by weight when analyzed by completely burning the polypropylene in air, said ash containing titanium in an amount not greater than 1 ppm by weight based on the weight of the polypropylene, and also contains chlorine in an amount not greater than 2 ppm by weight based on the weight of polypropylene and boiling n-heptane soluble matter in an amount not smaller than 1 wt. % but not greater than 10 wt. % based on the weight of polypropylene.

2. The electrical insulating film of claim 1 wherein the electrical insulating film has a thickness of 1 to 6 µm.

3. The electrical insulating film of claim 1 wherein the polymeric insulating material comprises high-purity polypropylene containing, per cubic centimeter, not more than 6,000 foreign particles of from 1 μm to 10 μm, both inclusive, not more than 1,000 foreign particles of from 5 μm to 10 μm, both inclusive, and no foreign particles greater than 10 μm.

4. The electrical insulating film of claim 1 wherein the polypropylene contains at least one additive selected from the group consisting of an inorganic oxide, an inorganic hydroxide, an organopolysilane, a maleic-anhydride-grafted polypropylene and a silane compound containing at least one organic polyether group.

5. The electrical insulating film of claim 4 wherein an inorganic oxide or hydroxide is added in an amount not smaller than 1 ppm by weight but not greater than 10% by weight based on the weight of the polymeric insulating material.

6. The electrical insulating film of claim 5 wherein the inorganic oxide or hydroxide is the oxide or hydroxide of magnesium, aluminum or iron, which is free of particles of 10 μm and greater in diameter and has an average particle size not greater than 1 μm.

7. The electrical insulating film of claim 4 wherein an organopolysilane is added in an amount not smaller than 50 ppm by weight but not greater than 10% by weight based on the weight of the polymeric insulating material.

8. The electrical insulating film of claim 4 wherein a maleic-anhydride-grafted polypropylene is added in an amount not smaller than 50 ppm by weight but not greater than 10% by weight based on the weight of the polymeric insulating material.

9. The electrical insulating film of claim 4 wherein a silane compound containing at least one organic polyether group is added in an amount smaller than 50 ppm by weight but not greater than 10% by weight based on the weight of the polymeric insulating material.

10. The electrical insulating film of claim 9 wherein the electrical insulating film has a thickness of 1 to 6 μm.

* * * * *

UNITED STATES PATENT AND TRADEMARK OFFICE
CERTIFICATE OF CORRECTION

PATENT NO. : 5,476,709
DATED : December 19, 1995
INVENTOR(S) : Inoue, et al

It is certified that error appears in the above-indentified patent and that said Letters Patent is hereby corrected as shown below:

On the title page, insert the following:

-- item [30] Foreign Priority Data
    Japanese Patent Application No. 4-337309 filed on December 17, 1992
    Japanese Patent Application No. 4-335974 filed on December 16, 1992
    Japanese Patent Application No. 4-334393 filed on December 15, 1992
    Japanese Patent Application No. 4-154850 filed on June 15, 1992 --

Section [57], Abstract line 1, delete "The invention provides a" and insert therefor --A--;
lines 12 and 13, delete "According to the invention, it is possible to" and insert therefor --To--;
line 14, delete "by adding to the polypropylene"; and
line 19, delete "group" and insert therefor --can be added to the polypropylene.--

Signed and Sealed this

Sixth Day of August, 1996

*Attest:*

BRUCE LEHMAN

*Attesting Officer*     Commissioner of Patents and Trademarks